United States Patent [19]
Endoh

[11] Patent Number: 5,617,165
[45] Date of Patent: Apr. 1, 1997

[54] FILM DRIVING MECHANISM OF A CAMERA

[75] Inventor: Yasuhiko Endoh, Tokyo, Japan

[73] Assignee: Asahi Kogaku Kogyo Kabushiki Kaisha, Tokyo, Japan

[21] Appl. No.: 639,304

[22] Filed: Apr. 25, 1996

[30] Foreign Application Priority Data

May 2, 1995 [JP] Japan .................................. 7-132912

[51] Int. Cl.⁶ .................................. G03B 1/18; G03B 1/00
[52] U.S. Cl. .................................................. 396/418
[58] Field of Search ................................ 354/173.1, 212, 354/214

[56] References Cited

U.S. PATENT DOCUMENTS

| | | |
|---|---|---|
| 3,448,669 | 6/1969 | Suzuki . |
| 3,693,523 | 9/1972 | Tenkumo et al. .................. 95/31 |
| 3,992,696 | 11/1975 | Arai . |
| 4,294,527 | 10/1981 | Hashimoto et al. ............... 354/25 |
| 4,351,598 | 9/1982 | Suzuki et al. ................... 354/288 |
| 4,364,547 | 12/1982 | Hashimoto et al. ............. 354/212 |
| 4,544,251 | 10/1985 | Haraguchi et al. . |
| 4,576,457 | 3/1986 | Fukuda et al. .................. 354/173.1 |
| 4,611,896 | 9/1986 | Iwashita ......................... 354/173.11 |
| 4,965,616 | 10/1990 | Horiuchi ........................ 354/212 |
| 5,091,740 | 2/1992 | Hori . |
| 5,105,211 | 4/1992 | Kameyama ...................... 354/173.1 |
| 5,337,108 | 8/1994 | Kaihara et al. ................. 354/218 |
| 5,341,187 | 8/1994 | Kurei . |
| 5,437,416 | 8/1995 | Ezawa et al. ................... 242/356.6 |
| 5,555,049 | 9/1996 | Sugita ............................ 354/173.1 |

*Primary Examiner*—Safet Metjahic
*Assistant Examiner*—John Chizmar
*Attorney, Agent, or Firm*—Greenblum & Bernstein P.L.C.

[57] ABSTRACT

A film driving mechanism of a camera includes a rewind fork which is engageable with a film spool of a film cartridge when the film cartridge is inserted into a film chamber of the camera. A motor selectively drives the rewind fork or a film take-up spool, and is positioned outside of the film take-up spool. The film take-up spool is made of a hollow cylindrical member and is used for winding a film from the film cartridge. First and second power transmitting means respectively transmit a rotation of the motor to the film take-up spool and the rewind fork. The second power transmitting means has a power transmitting member positioned inside the film take-up spool.

16 Claims, 6 Drawing Sheets

Fig. 8

FILM DRIVING MECHANISM OF A CAMERA

BACKGROUND OF THE INVENTION

1. Field of the Invention

The present invention relates to a film driving mechanism of a camera for winding or rewinding film.

2. Description of Related Art

A camera having a film driving mechanism, provided with a rewind fork projecting downwards from an upper wall of a film cartridge chamber of the camera, is well known. The rewind fork is engaged with a corresponding end of a film spool of a film cartridge, when the film cartridge is inserted in the film cartridge chamber.

In a camera of this type, a film take-up spool is provided in which a motor for driving the film spool is placed. Rotation of the motor is transmitted to the rewind fork through a lower gear train provided in a bottom portion of the camera, an upper gear train provided in an upper portion of the camera, and a rotational shaft which transmits the driving force of the motor from the lower gear train to the upper gear train.

In the aforementioned camera of this type, a reduction in the diameter of the film take-up spool is restricted since the motor is placed inside. Further, it is necessary to provide enough space to accommodate the rotational shaft, thus making it difficult to design a smaller and more compact camera, most notably in the camera width.

SUMMARY OF THE INVENTION

The primary object of the present invention is to provide a film driving mechanism for a camera that makes it possible to design a smaller and more compact camera.

To achieve the object mentioned above, according to the present invention, there is provided a film driving mechanism of a camera including a rewind fork which is engageable with a film spool of a film cartridge when the film cartridge is inserted into a film chamber of the camera. A motor, which selectively drives the rewind fork or a film take-up spool, is positioned outside of the film take-up spool. The film take-up spool is a hollow cylindrical member and is used for winding a film from the film cartridge. First and second power transmitting mechanisms respectively transmit rotation of the motor to the film take-up spool and the rewind fork. The second power transmitting mechanism includes a power transmitting member positioned inside the film take-up spool. Since the motor is placed outside the film take-up spool, the diameter of the film take-up spool can be minimized, which makes it possible to produce a small, compact camera.

Preferably, a first gear train is positioned at one end of the film take-up spool, with the first and second power transmitting mechanism sharing a section of the first gear train. The second power transmitting mechanism preferably includes a second gear train which is positioned at another end of the film take-up spool, so as to preferably extend to the rewind fork.

The first gear train preferably includes a switching mechanism switches for between a first state, in which the rotation of the motor is transmitted to the film take-up spool by a predetermined rotational direction, and a second state, in which the rotation of the motor is transmitted to the rewind fork by another rotational direction opposite to the predetermined rotational direction. The switching mechanism can take the form of a planetary gear having a sun gear and a planet gear which meshes with and revolves about the sun gear.

Preferably, the power transmitting member is a rotational shaft positioned in the film take-up spool. The film take-up spool is provided on the one end thereof with a circumferential gear, and the rotational shaft is provided at one end thereof, below the circumferential gear, with a first spur gear coaxial to the circumferential gear. With this arrangement the planet gear meshes with the circumferential gear and the first spur gear when a drive shaft of the motor respectively rotates in forward and reverse directions, respectively. The drive shaft can be positioned in a variety of positions, for example, substantially perpendicular or parallel to a rotational axis of the film take-up spool.

The second power transmitting mechanism can also include a second gear train positioned at another end of the film take-up spool and extending to the rewind fork. Preferably, the rotational shaft has, at another end thereof, a second spur gear, coaxial to the first spur gear, which meshes with a primary gear of the second gear train.

In another aspect of the present invention a camera is provided including a rewind fork which projects downwards from an upper wall of a film chamber of the camera. A cylindrical-shaped film take-up spool is rotatably supported in a spool chamber. A motor, positioned outside the film take-up spool, selectively drives the rewind fork or the film take-up spool. First and second power transmitting mechanisms respectively transmit rotation of the motor to the film take-up spool and the rewind fork. The second power transmitting mechanism includes a power transmitting member positioned inside the film take-up spool.

According to another aspect of the present invention a film driving mechanism of a camera for winding or rewinding a film from or into a film cartridge placed in a film chamber of the camera is provided. The film driving mechanism includes a rewind fork, which projects from an upper wall of the film chamber. The rewind fork engages with a corresponding end of a film spool, rotatably provided in the film cartridge, when the film cartridge is placed in the film chamber. A film take-up spool, having a hollow cylindrical shape, for winding the film from the film cartridge, is provided on a lower end thereof with a circumferential gear. A rotating shaft is positioned inside the film take-up spool, and has first and second gears on lower and upper ends thereof, respectively. The first gear is located below the circumferential gear, and the second gear is connected to the rewind fork through a gear train. A motor, which selectively drives the rewind fork or the film take-up spool, is positioned in a bottom portion of the camera and outside the film take-up spool. A planetary gear, having a sun gear and a planet gear meshing with and revolving about the sun gear is provided. The planet gear selectively meshes with the first or second gear depending on a rotational direction of a drive shaft of the motor. A gear train transmits a rotation of the motor to the sun gear.

The present disclosure relates to subject matter contained in Japanese Patent Application No. 7-132912 (filed on May 2, 1995) which is expressly incorporated herein by reference in its entirety.

BRIEF DESCRIPTION OF THE DRAWINGS

The invention will be described below in detail with reference to the accompanying drawings, in which like reference numerals indicate similar parts, and wherein.

DESCRIPTION OF THE PREFERRED EMBODIMENT

Figure 1:
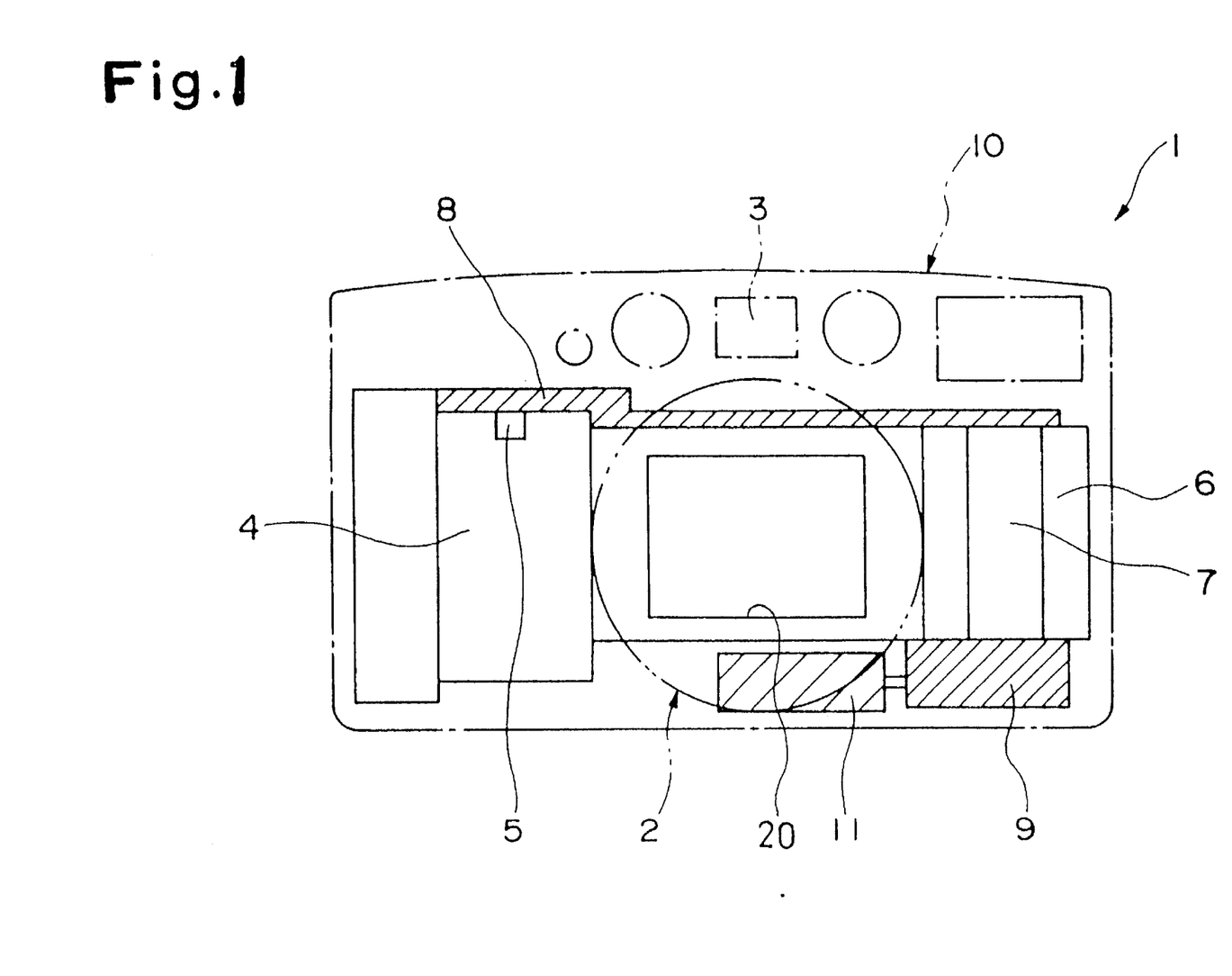
FIG. 1 is a rear elevational view of an embodiment of a camera to which the present invention is applied.
Figure 3:
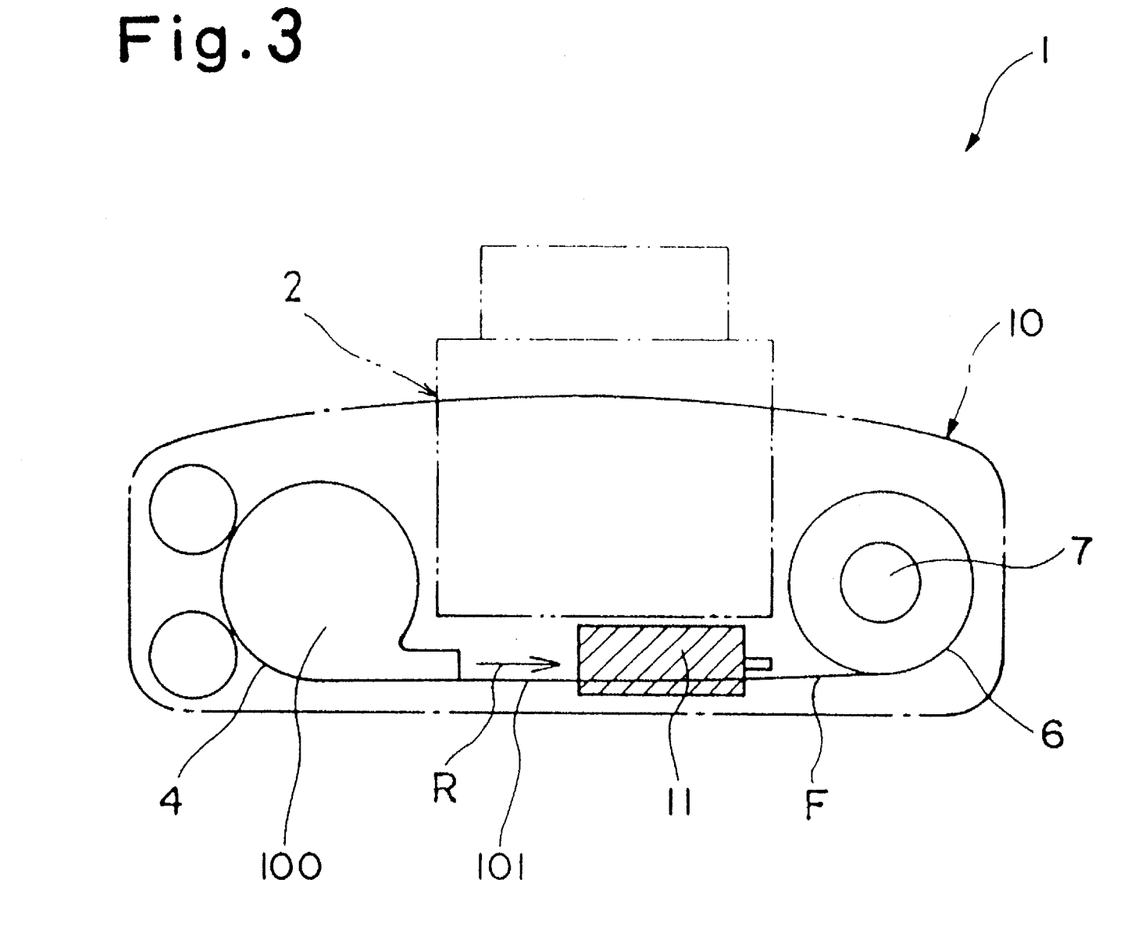
FIG. 3 is a plan view of the camera shown in FIG. 1.

As shown in FIG. 1, a camera 1, to which the present invention is applied, is provided with a rectangular-shaped picture format or a photographic aperture 20. On respective sides of the aperture 20, a spool chamber 6 and a film chamber 4 are provided. A film take-up spool 7, used for winding a film F of a 35 mm conventional type film cartridge 100 accommodated in the film chamber 4 (FIG. 3), is provided in the spool chamber 6. On the front wall of the camera 1 is provided a photographic lens 2 and a finder objective window 3.

A rewind fork 5 is provided which projects downwards from an upper wall of the film chamber 4. When the film cartridge 100 is properly placed in the film chamber 4, the rewind fork 5 is engaged with a corresponding end of a film spool (not shown) of the film cartridge 100.

The camera 1 is also provided, in a lower rear portion of a camera body 10, with a motor 11. The motor 11 is positioned in the camera body 10 such that a rotating drive shaft 11a of the motor 11 is substantially parallel with a direction of film movement indicated by an arrow R in FIG. 3. That is, the motor 11 is placed in the camera body 10 such that the rotating drive shaft 11a is substantially perpendicular to a rotational axis C (see FIG. 4) of the film take-up spool 7.

The camera 1 is also provided with a first power transmitting mechanism for transmitting rotation of the motor 11 to the film take-up spool 7, and a second power transmitting mechanism for transmitting rotation of the motor 11 to the rewind fork 5. The second power transmitting mechanism includes a power transmitting member provided inside the film take-up spool 7.

Figure 2:
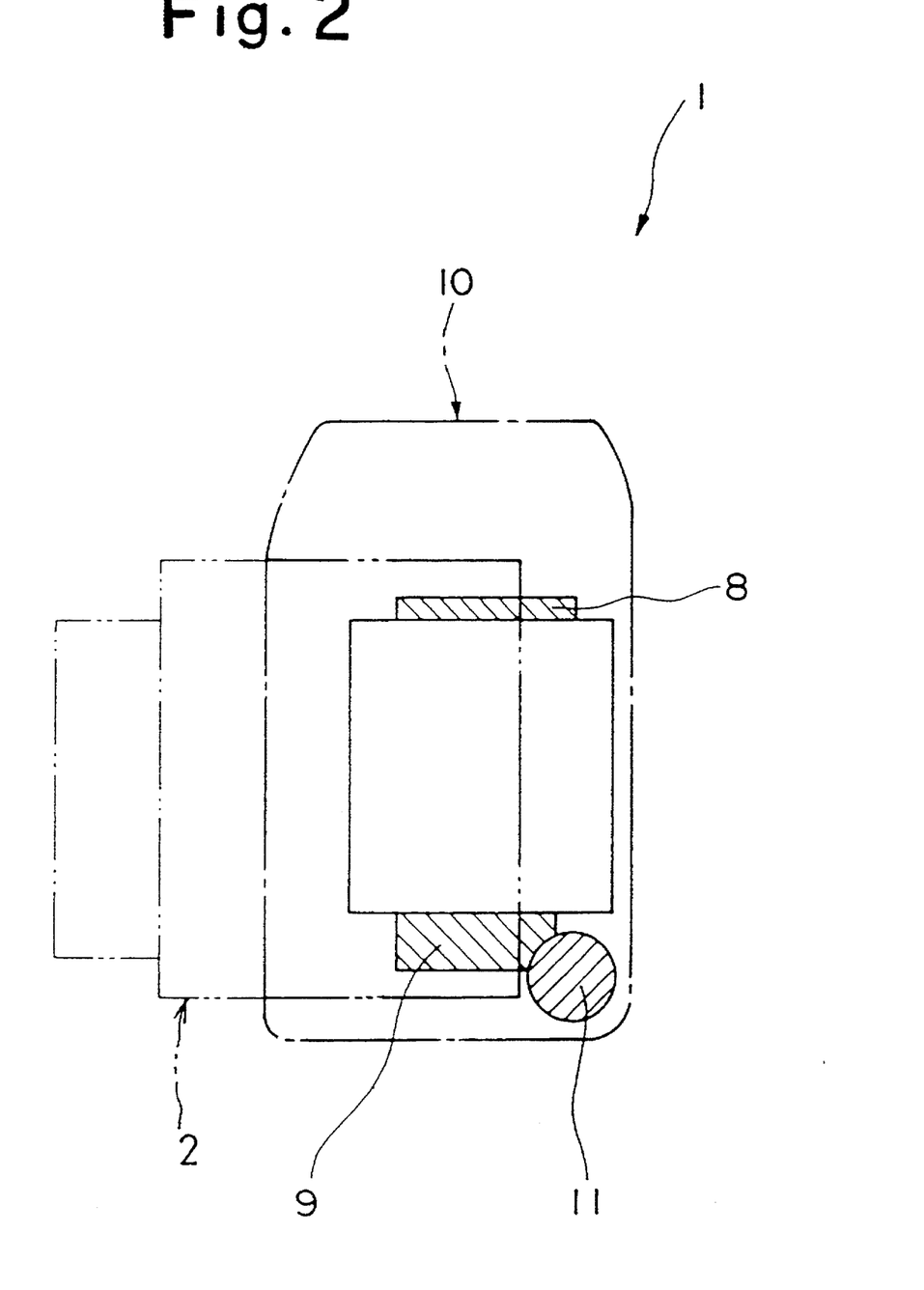
FIG. 2 is a side elevational view of the camera shown in FIG. 1.

The above-noted first and second power transmitting mechanisms share a part of a common reduction gear train (i.e., first gear train) 9 which is placed under the film take-up spool 7, as shown in FIG. 2. The second power transmitting mechanism further includes an idle gear train (i.e., second gear train) 8 which is placed above, and extends over, the film chamber 4 and the spool chamber 6.

The details of the first and second power transmitting mechanisms will be hereinafter explained.

Figure 4:
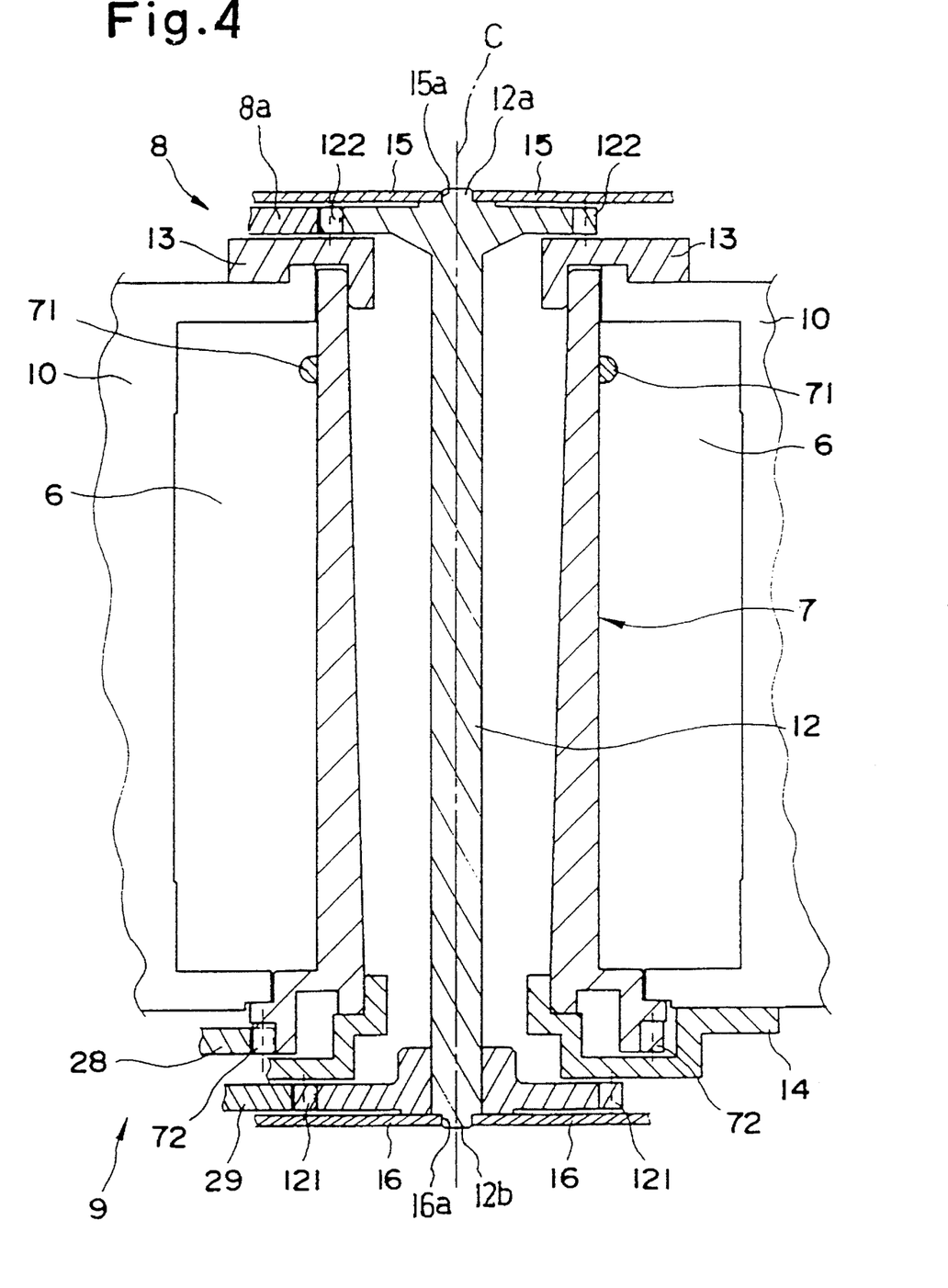
FIG. 4 is a cross sectional view of a film take-up spool and a peripheral portion thereof in the camera shown in FIG. 1.

As shown in FIG. 4, the film take-up spool 7 has a hollow cylindrical shape and is provided on an outer circumferential portion thereof with a plurality of teeth 71 which engage with film sprocket holes (not shown) of the film F. A circumferential spool gear 72 is formed integral on the lower end of the film take-up spool 7.

Spool supporting members 13 and 14, fixed to the camera body 10, are provided respectively on the upper and lower ends of the film take-up spool 7. The film take-up spool 7 is supported by the spool supporting members 13 and 14 in a rotatable manner.

The second power transmitting mechanism includes a rotational shaft 12 as the above-noted power transmitting member, a rewind gear (first spur gear) 121 fixed on the lower end of the rotational shaft 12 and a spur gear (second spur gear) 122 integrally fixed with the upper end of the rotational shaft 12. Through the rotational shaft 12, the rewind gear 121 and the spur gear 122, the drive force generated by the motor 11 is transmitted from the reduction gear train 9 to the idle gear train 8. The spur gear 122 stays in mesh with a primary gear 8a of the idle gear train 8. A final gear (not shown) of the idle gear train 8 stays in mesh with a gear (not shown) coaxially connected to the rewind fork 5.

The rotational shaft 12 is placed in the film take-up spool 7 in such a manner that the axial center of the rotational shaft 12 coincides with the rotational axis C of the film take-up spool 7.

The rotational shaft 12 is respectively provided on upper and lower ends thereof with central projections 12a and 12b. An upper base plate 15 and a lower base plate 16 which are parallel to each other and fixed to the camera body, are provided with aligned holes 15a and 16a. The central projections 12a and 12b are respectively engaged with the holes 15a and 16a, so that the rotational shaft 12 is rotatable in the film take-up spool 7. The axial centers of the rewind gear 121, the gear 122 and the above-noted spool gear 72 are coincident with one another.

Figure 5:
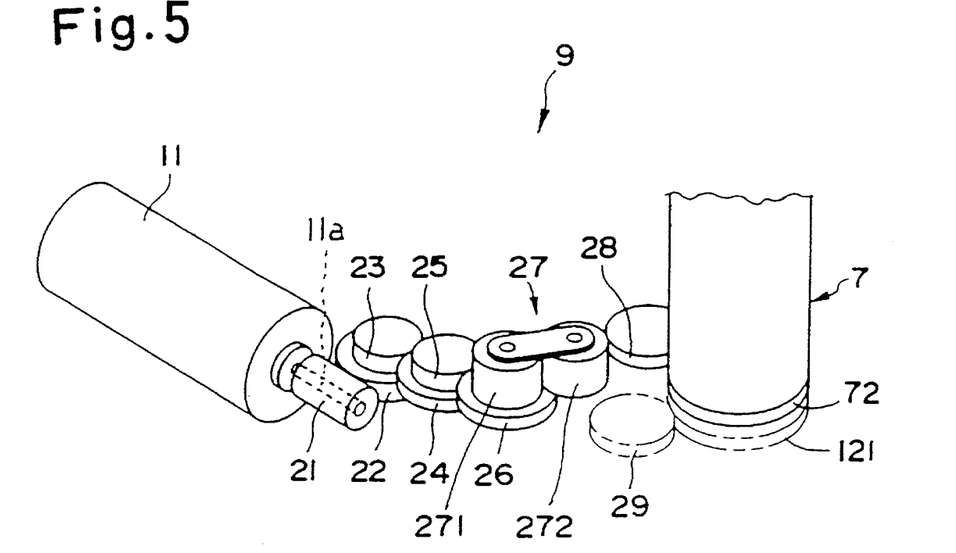
FIG. 5 is a perspective view of a motor, the film take-up spool and a reduction gear train positioned between the motor and the film take-up spool, showing a state in which a planet gear of a planetary gear, provided in the reduction gear train, is engaged with a gear that is in mesh with a circumferential gear formed on the film take-up spool, according to a first embodiment of the present invention.

The details of the reduction gear train 9 will be hereinafter discussed. The reduction gear train 9 is provided between the motor 11 and the film take-up spool 7, as shown in FIG. 5. The reduction gear train 9 transmits rotation of the motor 11 to the spool gear 72 and the rewind gear 121, while reducing the speed of rotation of the motor 11.

The reduction gear train 9 is comprised of a worm gear 21, a worm wheel 22, spur gears 23, 24, 25 and 26, a planetary gear 27, a spool idle gear 28 and a rewind idle gear 29. The first power transmitting mechanism is comprised of the worm 21, the worm wheel 22, the gears 23, 24, 25 and 26, the planetary gear 27, the spool idle gear 28 and the circumferential gear 72. The second power transmitting mechanism is comprised of the worm 21, the worm wheel 22, the gears 23, 24, 25 and 2 6, the planetary gear 27, the rewind idle gear 29, the rewind gear 121, the rotational shaft 12, the gear 122, the idle gear train 8 and the above-mentioned gear coaxially connected to the rewind fork 5. Therefore, the first and second power transmitting mechanisms share a part of the reduction gear train 9, i.e, the worm 21, the worm wheel 22, the gears 23, 24, 25 and 26 and the planetary gear 27. The spool idle gear 28 and the rewind idle gear 29 of the reduction gear train 9 are exclusively used in the first and second power transmitting mechanisms, respectively.

The planetary gear 27 is provided with a sun gear 271 and a planet gear 272 which meshes with, and rotates about, the sun gear 271.

The worm 21 is fixed on the drive rotational shaft 11a of the motor 11 and engages the worm wheel 22. The worm wheel 22 is integrally formed coaxial with the gear 23. The gear 23 has a smaller diameter than that of the worm wheel 22 and is engaged with the gear 24. The gear 24 is integrally formed coaxial with the gear 25. The gear 25 has a smaller diameter than that of the gear 24 and is engaged with the gear 26. The gear 26 is integrally formed coaxial with the sun gear 271. The spool gear 72 stays in mesh with the spool idle gear 28, and the rewind gear 121 stays in mesh with the rewind idle gear 29.

The film loading, winding and rewinding operations of the camera 1 will be hereinafter discussed.

[Film Loading Operation]

Upon loading, the film cartridge 100 is placed in the film chamber 4 with the film slot of the film cartridge 100 facing the film take-up spool 7, and the end of the film is placed on the film take-up spool 7 with the film sprocket holes being engaged with some of the teeth 71 on the film take-up spool 7. In this state, upon closing an openable back cover (not shown) of the camera 1, the film take-up spool 7 starts rotating to wind up the film F and subsequently stops rotating when the first frame of the film F is set.

In the above winding operation, the motor 11 is actuated to rotate its rotational shaft 11a in the forward direction to rotate the film F, so that the rotation of the motor 11 is transmitted to the sun gear 271 through the worm 21, the worm wheel 22, gears 23, 24, 25 and 26, so that the sun gear 271 rotates in the counterclockwise direction in FIG. 5. The planet gear 272 rotates about the sun gear 271 in the same direction to thereby mesh with the spool idle gear 28 while rotating about its axis in the clockwise direction in FIG. 5, so that the spool idle gear 28 rotates in the counterclockwise direction in FIG. 5. Rotation of the spool idle gear 28 is then transmitted to the spool gear 72, so that the spool gear 72 rotates in the clockwise direction in FIG. 5, rotating the film take-up spool 7 in the same direction. Consequently, the film F is wound by the film take-up spool 7 until the first frame of the film F is set. In this winding operation, the rotation of the motor 11 is not transmitted to the rewind fork 5 since the planetary gear 272 is not engaged with the rewind idle gear 29.

[Winding Operation by One Frame]

The film F is wound by one picture frame each time a picture is taken to prepare for taking the next picture. In this operation the motor 11 is actuated to rotate its drive rotational shaft 11a in the forward direction, similar to the above-noted loading operation.

[Rewinding Operation]

Figure 6:
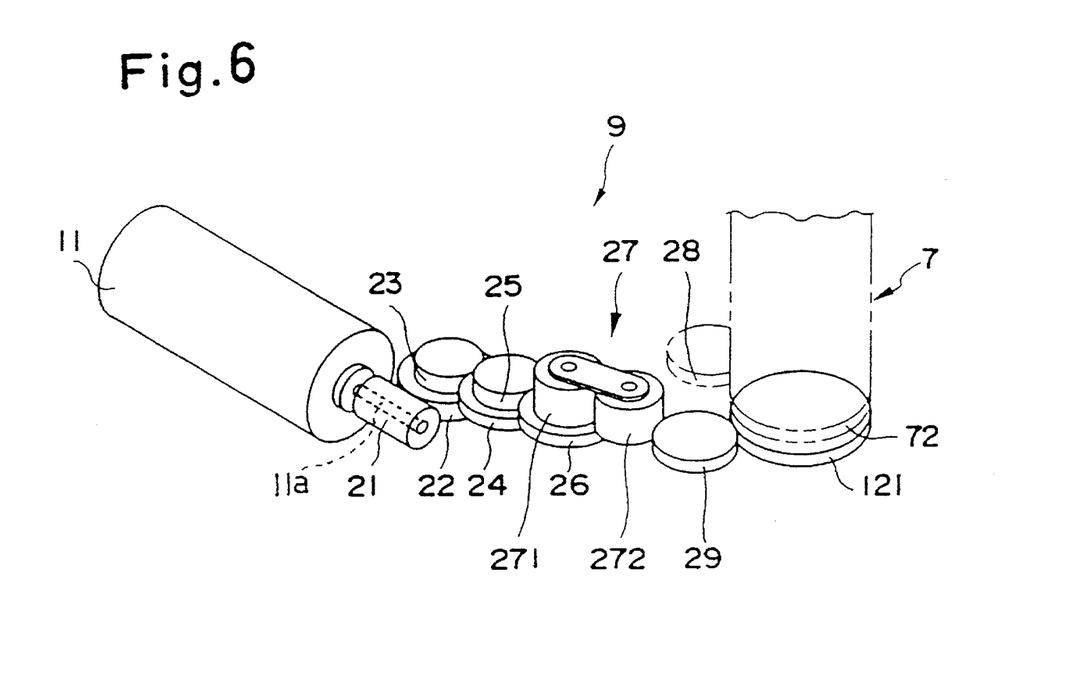
FIG. 6 is a perspective view of the motor, the film take-up spool and the reduction gear train shown in FIG. 5, showing another state in which the planet gear of the planetary gear is engaged with a gear that is in mesh with a spur gear fixed on the lower end of a rotational shaft placed in the film take-up spool.

The motor 11 is actuated to rotate its rotational drive shaft 11a in the reverse direction to rewind the film F. Rotation of the motor 11 is transmitted to the sun gear 271 through the worm 21, the worm wheel 22, gears 23, 24, 25 and 26, such that the sun gear 271 rotates in the clockwise direction in FIG. 6. Planet gear 272 rotates about the sun gear 271 in the same direction to disengage with the spool idle gear 28 and subsequently engage with the rewind idle gear 29. Planet gear 272 rotates about its axis in the counterclockwise direction in FIG. 6, so that the rewind idle gear 29 rotates in the clockwise direction in FIG. 6. This rotation of the rewind idle gear 29 is then transmitted to the rewind gear 121. The rewind gear 121 rotates in the counterclockwise direction in FIG. 6 to rotate the rotational shaft 12 in the same direction. In this rewinding operation, the rotation of the motor 11 is not transmitted to the film take-up spool 7 since the planet gear 272 is not engaged with the spool idle gear 28.

As noted above, since the rotational shaft 12 is integral with the gear 122, gear 122 and shaft 12 rotate together in the counterclockwise direction in FIG. 4. This rotation of the gear 122 is transmitted to the rewind fork 5 through the idle gear train 8. Consequently, the rewind fork 5 rotates in the rewind direction to rewind the film F.

As can be understood from the foregoing, in the camera 1 to which the present invention is applied, the motor 11 is placed outside the film take-up spool 7. Therefore, the diameter of the film take-up spool 7 can be minimized for a smaller, more compact camera.

Furthermore, since the rotational shaft 12, whose diameter is much smaller than that of the motor 11, is positioned inside the film take-up spool 7, the space in the film take-up spool 7 is effectively utilized, which leads to the camera being more compact than the prior art.

The second embodiment of the present invention will now be discussed hereinafter with reference to FIGS. 7 and 8. This second embodiment is similar to the first embodiment in many respects, and therefore only the structure different from the first embodiment will be explained.

In the second embodiment, a flat cylindrical motor 110 is used instead of the motor 11 of the first embodiment. The flat cylindrical motor 110 has a drive rotational shaft 110a which extends upwards, and is parallel to the rotational axis C of the film take-up spool 7. The second embodiment is identical to the first embodiment, except in that the motor 110 is used in the second embodiment while the motor 10 is used in the first embodiment, and that a reduction gear train 9a is used in the second embodiment while the reduction gear train 9 is used in the first embodiment. Some of the gears of the reduction gear train 9a are similar to those of the reduction gear train 9.

Figure 7:
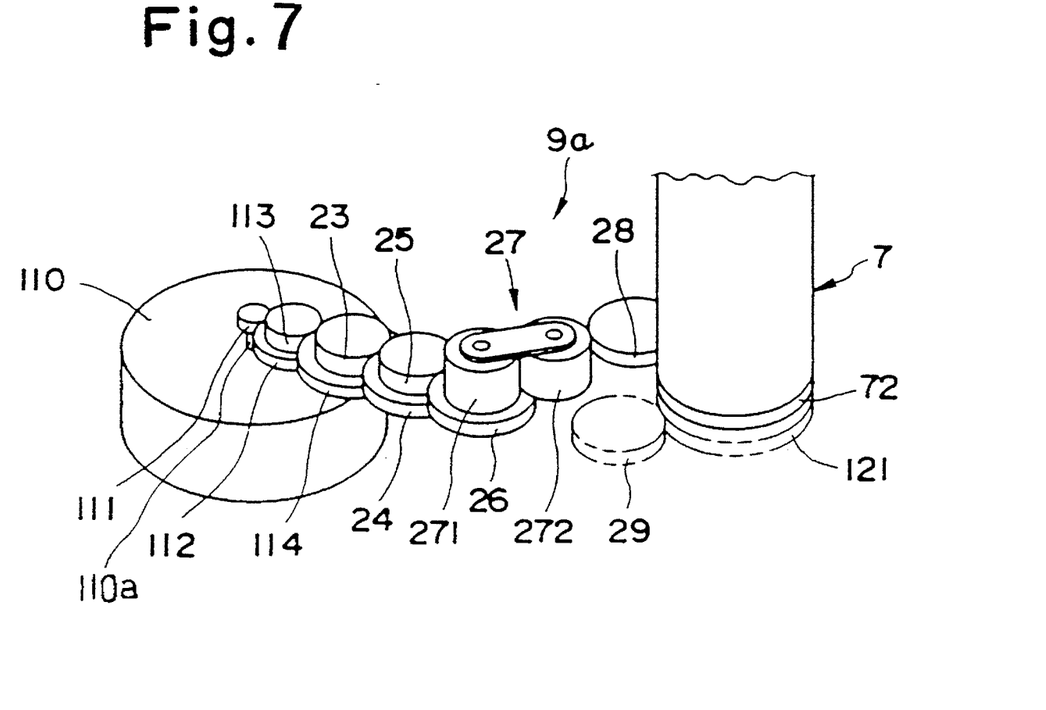
FIG. 7 is a perspective view of a different type of motor, the film take-up spool and a reduction gear train placed between the motor and the film Lake-up spool, which corresponds to the state shown in FIG. 5 and shows another embodiment of the present invention.

The reduction gear train 9a is provided between the motor 110 and the film take-up spool 7 as shown in FIG. 7. The reduction gear train 9a transmits rotation of the motor 110 to the spool gear 72 and the rewind gear 121, while reducing the rotation speed of the motor 110.

The reduction gear train 9a is comprised of a pinion gear 111, spur gears 112, 113, 114, 23, 24, 25 and 26, the planetary gear 27, the spool idle gear 28 and the rewind idle gear 29.

The pinion 111 is fixed on the drive rotational shaft 110a of the motor 110 and engages with the gear 112. The gear 112 is integrally formed coaxial with the gear 113. The gear 113 has a smaller diameter than that of the gear 112 and is engaged with the gear 114. The gear 114 is integrally formed coaxial with the gear 25.

The rest of the structure of the reduction gear train 9a is identical to the reduction gear train 9 of the first embodiment.

When the motor 110 is actuated to rotate its rotational drive shaft 110a in the forward direction to wind the film F, this rotation of the motor 110 is transmitted to the sun gear 271 through the gears 111, 112, 113, 114, 23, 24, 25 and 26, so that the sun gear 271 rotates in the counterclockwise direction in FIG. 7. The planet gear 272 rotates about the sun gear 271 in the same direction to thereby mesh with the spool idle gear 28 while rotating about its axis in the clockwise direction in FIG. 7, so that the spool idle gear 28 rotates in the counterclockwise direction in FIG. 7.

Thereafter, similar to the first embodiment, the rotation of the spool idle gear 28 is transmitted to the spool gear 72.

Spool gear 72 rotates in the clockwise direction in FIG. 7 to rotate the film take-up spool 7 in the same direction. Consequently, the film F is wound by the film take-up spool 7 until the first frame of the film F is set.

Figure 8:
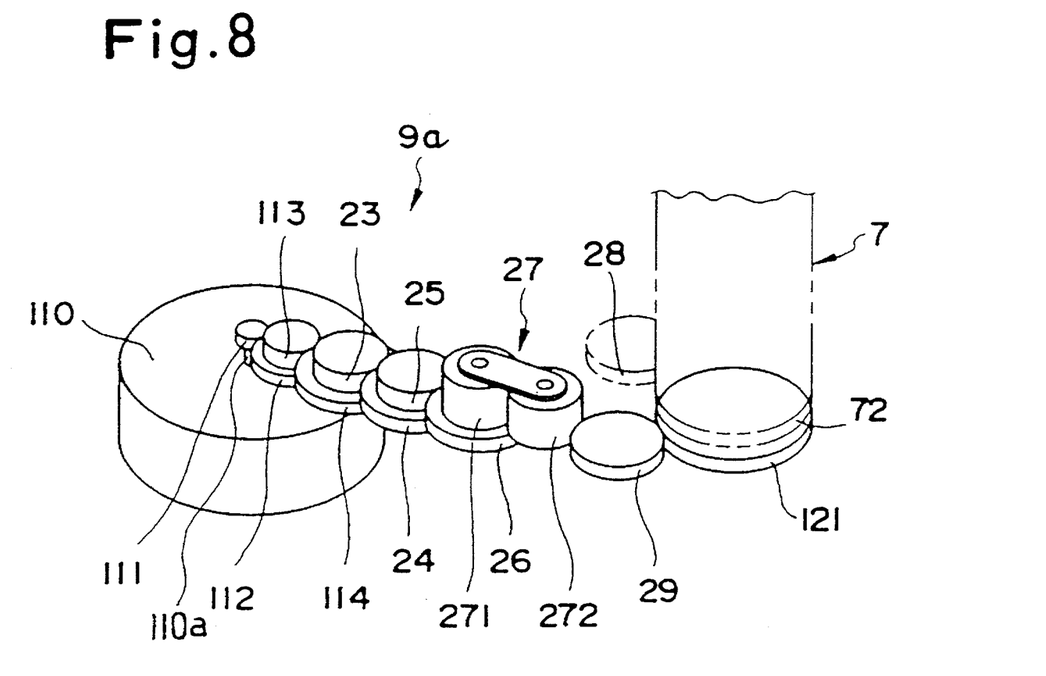
FIG. 8 is a perspective view of the motor, the film take-up spool and the reduction gear train shown in FIG. 7, which corresponds to the state shown in FIG. 6.

When the motor 110 is actuated to rotate its rotational drive shaft 110a in the reverse direction to rewind the film F, this rotation of the motor 110 is transmitted to the sun gear 271 through the gears 111, 112, 113, 114, 23, 24, 25 and 26, so that the sun gear 271 rotates in the clockwise direction in FIG. 8. The planet gear 272 rotates about the sun gear 271 in the same direction, disengages with the spool idle gear 28, and subsequently engages with the rewind idle gear 29. The rewind idle gear 29 thus rotates in the clockwise direction in FIG. 8. Thereafter, similar to the first embodiment, this rotation of the rewind idle gear 29 is then transmitted to the rewind gear 121. The rewind gear 121 rotates in the counterclockwise direction in FIG. 8 to thereby rotate the rotational shaft 12 in the same direction. The gear 122 rotates together with the rotational shaft 12 in the counterclockwise direction in FIG. 4. This rotation of the gear 122 is transmitted to the rewind fork 5 through the idle gear train 8, so that the rewind fork 5 rotates in the rewind direction to rewind film F.

In the second embodiment, the motor 110 is also positioned outside the film take-up spool 7, similar to the first embodiment. Therefore, the diameter of the film take-up spool 7 can be minimized, which makes it possible to realize a smaller and more compact camera.

Although the present invention is applied to the camera 1 using the film cartridge 100 of 35 mm conventional type in the above first and second embodiments, the present invention may be equally applied to any other type of camera, e.g., a camera adopting APS (Advanced Photo System), developed by the U.S. company KODAK and using an IX240 type film cartridge.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A film driving mechanism of a camera, comprising:
   a rewind fork engageable with a film spool of a film cartridge when said film cartridge is inserted into a film chamber of said camera;
   a film take-up spool for winding a film from said film cartridge, said film take-up spool being made of a hollow cylindrical member;
   a motor for selectively driving one of said rewind fork and said film take-up spool, said motor being disposed outside said film take-up spool;
   first power transmitting means for transmitting a rotation of said motor to said film take-up spool; and
   second power transmitting means for transmitting said rotation of said motor to said rewind fork, wherein said second power transmitting means comprises a power transmitting member positioned inside said film take-up spool.

2. The film driving mechanism of claim 1, further comprising a first gear train positioned at one end of said film take-up spool, wherein said first and said second power transmitting means share a section of said first gear train.

3. The film driving mechanism of claim 2, wherein said second power transmitting means comprises a second gear train positioned at another end of said film take-up spool.

4. The film driving mechanism of claim 3, wherein said second gear train extends from said another end of said film take-up spool to said rewind fork.

5. The film driving mechanism of claim 2, wherein said first gear train comprises means for selectively switching between a first state, in which rotation of said motor is transmitted to said film take-up spool in a predetermined rotational direction, and a second state, in which rotation of said motor is transmitted to said rewind fork by another rotational direction opposite said predetermined rotational direction.

6. The film driving mechanism of claim 5, wherein said switching means comprises a planetary gear including a sun gear and a planet gear, said planet gear meshing with and revolving about said sun gear.

7. The film driving mechanism of claim 6, wherein said power transmitting member comprises a rotational shaft positioned inside said film take-up spool.

8. The film driving mechanism of claim 7, further comprising:
   said film take-up spool having a circumferential gear on said one end;
   said rotational shaft having a first spur gear, coaxial to and below said circumferential gear mounted on a first end of said rotational shaft; and
   said planet gear selectively meshing with said circumferential gear and said first spur ear when a drive shaft of said motor rotates in forward and reverse directions, respectively.

9. The film driving mechanism of claim 8, wherein said second power transmitting means comprises a second gear train positioned at another end of said film take-up spool.

10. The film driving mechanism of claim 9, wherein said second gear train extends from said another end of said film take-up spool to said rewind fork.

11. The film driving mechanism of claim 10, wherein said rotational shaft has a second spur gear mounted coaxial to said first spur gear on a second end of said rotational shaft, said second spur gear meshing with a primary gear of said second gear train.

12. The film driving mechanism of claim 1, wherein said power transmitting member comprises a rotational shaft positioned inside said film take-up spool.

13. The film driving mechanism of claim 1, wherein a drive shaft of said motor is substantially parallel to a rotational axis of said film take-up spool.

14. The film driving mechanism of claim 1, wherein a drive shaft of said motor is substantially parallel to a rotational axis of said film take-up spool.

15. A camera, comprising:
   a rewind fork projecting downwards from an upper wall of a film chamber of said camera;
   a cylindrical-shaped film take-up spool rotatably supported in a spool chamber;
   a motor for selectively driving said rewind fork or said film take-up spool, said motor being disposed outside said film take-up spool;
   first power transmitting means for transmitting a rotation of said motor to said film take-up spool; and second power transmitting means for transmitting rotation of said motor to said rewind fork, wherein said second power transmitting means comprises a power transmitting member positioned inside said film take-up spool.

16. A film driving mechanism of a camera for winding or rewinding a film from or into a film cartridge placed in a film chamber of said camera, said film driving mechanism comprising;

a rewind fork projecting from an upper wall of said film chamber, said rewind fork being engaged with a corresponding end of a film spool rotatably provided in said film cartridge when said film cartridge is placed in said film chamber;

a film take-up spool, having a hollow cylindrical shape, for winding said film supplied from said film cartridge, said film take-up spool being provided on a lower end thereof with a circumferential gear;

a rotating shaft positioned inside said film take-up spool having first and second gears on lower and upper ends thereof, respectively, said first gear, and said second gear being connected to said rewind fork through a gear train;

a motor for selectively driving one of said rewind fork and said film take=up spool, said motor being positioned in a bottom portion of said camera and outside said film take-up spool;

a planetary gear including a sun gear and a planet gear meshing with and revolving about said sun gear, said planet gear selectively meshing with one of said first gear and said second gear, based on a rotational direction of a drive shaft of said motor; and a gear train for transmitting a rotation of said motor to said sun gear.

* * * * *

UNITED STATES PATENT AND TRADEMARK OFFICE
CERTIFICATE OF CORRECTION

PATENT NO. : 5,617,165
DATED : April 1, 1997
INVENTOR(S) : Yasuhiko ENDOH

It is certified that error appears in the above-indentified patent and that said Letters Patent is hereby corrected as shown below:

At column 8, line 27 (claim 8, line 9), change "ear" to ---gear---.

At column 8, line 45 (claim 13, line 2), change "parallel" to ---perpendicular---.

At column 10, line 2 (claim 16, line 20), change "take=up" to ---take-up---.

Signed and Sealed this

Sixteenth Day of September, 1997

Attest:

BRUCE LEHMAN

Attesting Officer

Commissioner of Patents and Trademarks